United States Patent [19]

Matsushita

[11] 3,828,715
[45] Aug. 13, 1974

[54] AIR CUSHION TYPE FENDER FOR USE WITH A QUAY-WALL

[75] Inventor: Kazuo Matsushita, Hiratsuka, Japan

[73] Assignee: The Yokohama Rubber Co., Ltd., Tokyo, Japan

[22] Filed: Feb. 12, 1973

[21] Appl. No.: 331,566

[30] Foreign Application Priority Data
June 23, 1972 Japan................................ 47-74117

[52] U.S. Cl..................................... 114/219, 61/48
[51] Int. Cl........................ B63b 51/02, E02b 3/22
[58] Field of Search............ 114/219; 61/48; 293/1, 293/DIG. 2; 267/139, 140, 153

[56] References Cited
UNITED STATES PATENTS

| | | | |
|---|---|---|---|
| 2,829,915 | 4/1958 | Claveau | 114/219 X |
| 3,176,982 | 4/1965 | O'Daniell | 9/8 R X |
| 3,254,883 | 6/1966 | Morgan | 293/DIG. 2 |
| 3,361,467 | 1/1968 | Ludwikowski | 267/140 |
| 3,418,815 | 12/1968 | Kumazawa | 114/219 X |
| 3,473,836 | 10/1969 | Halter | 114/219 X |
| 3,600,896 | 8/1971 | Tateisi | 114/219 X |

*Primary Examiner*—Trygve M. Blix
*Assistant Examiner*—Gregory W. O'Connor

[57] ABSTRACT

An air cushion type fender for use at a quay-wall is provided having a hat-shaped body made of a rubbery resilient material and a bottom plate adapted to seal and close the bottom opening of the hat-shaped body which is filled with pressurized air. The hat-shaped body has a flange extending outwardly from the edge of its bottom opening, permitting mounting on the quay-wall by anchor bolts. This fender provides excellent damping of the initial impact at the instant of first contact of a vessel moored parallel to or at an angle with the quay-wall, by slipping and restoring to its original shape.

8 Claims, 10 Drawing Figures

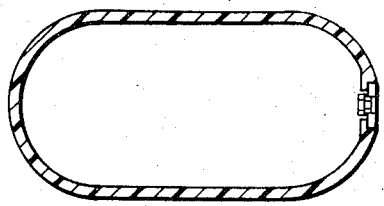
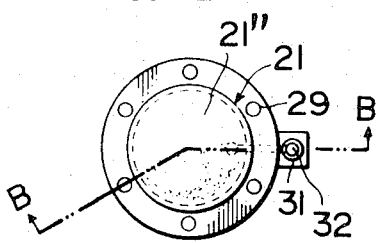
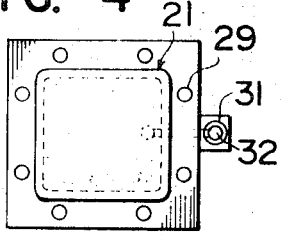
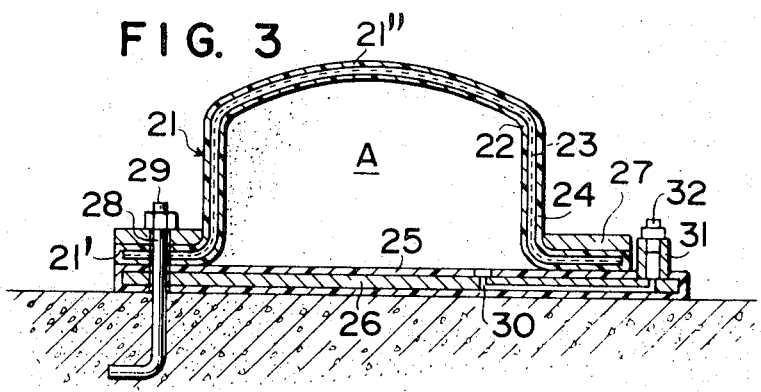
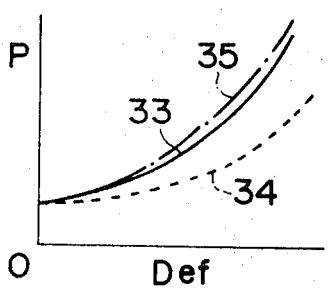
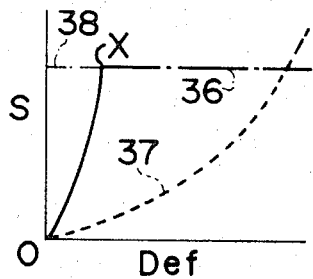

3,828,715

AIR CUSHION TYPE FENDER FOR USE WITH A QUAY-WALL

BACKGROUND OF THE INVENTION

1. Field of the Invention

The present invention relates to improvements in air cushion type fenders used at quay-walls.

2. Description of the Prior Art

Conventional float type air cushion fenders have been widely used. The conventional float type air cushion fender has a shell portion of a pillow shape reinforced with a rubber layer which is filled with compressed air, thus enabling it to float on the water surface. However, this type of fender suffers from several shortcomings including the fact that the fender is subject to a great amount of deflection when a boat contacts a quay-wall and as a result, these fenders must be constructed with relatively large diameters. Also, these fenders are commonly moored to the quay-wall with wire nets which subject them to considerable damage, particularly in the typhoon season.

Solid type fenders which utilize only the resiliency of rubber to effect damping have also been used at quay-walls. The size of the solid type fenders is usually limited to approximately 2 m in diameter because if such a limit is exceeded, the weight of the fender becomes difficult to handle and the bearing pressure increases to a point where the use of a special outer skin plate is required to hold the mooring line.

SUMMARY OF THE INVENTION

It has now been discovered that the foregoing shortcomings of the prior art can be readily overcome by an air cushion, hat-shaped fender. The fender has a hat-shaped body made of a resilient material. It is reinforced with a suitable reinforcement material and has a bottom plate adapted to seal and close the bottom opening of the hat-shaped body. The cushion is filled with compressed air. The body of the fender has a flange portion extending outwardly from the edge of the bottom opening. The flange is provided with a plurality of bolt holes for receiving anchor bolts mounted in the quay-wall. The bottom plate has an air passage therein which enables the introduction of air into the body of the fender.

The top or crown portion of the hat-shaped body of the fender may be formed in the shape of a dome. This construction efficiently damps the initial impact at the instant a boat contacts the quay-wall. Alternatively, the top may contain a metal plate to accommodate the impact of a large size vessel, although the energy absorption at the initial impact with the quay-wall may be somewhat sacrificed.

The present fender can be made smaller and more compact than the conventional float type fenders and still affords excellent damping characteristics.

Accordingly, it is a principal object of the invention to provide an air cushion type fender which can be mounted on a quay-wall and which is of a compact size, yet which presents excellent damping characteristics.

It is another object of the invention to provide such a fender which can accommodate the impact of a large size vessel against a quay-wall with a high degree of energy absorption.

It is a further object of the invention to provide such a fender which can accommodate the movement of a moored vessel parallel to or at an angle with a quay-wall by slipping and restoring its shape.

Other objects and further scope of applicability of the present invention would become apparent from the detailed description to follow, taken in conjunction with the accompanying drawing.

BRIEF DESCRIPTION OF THE DRAWINGS

FIG. 1 is a cross-sectional view of a conventional, float type fender which is of a pillow shape;

FIG. 2 is a plan view of an air cushion type hat-shaped fender of the present invention;

FIG. 3 is a vertical cross-sectional view of a fender of the present invention;

FIG. 4 is a plan view of a fender of the present invention having a square, lateral cross-section;

FIG. 5 is a graph showing the relationship of the inner pressure versus deflection for various fenders;

FIG. 6 is a graph representing the relationship of the area of a contacting surface of a fender versus the deflection thereof;

DESCRIPTION OF THE PREFERRED EMBODIMENTS

Figure 7:
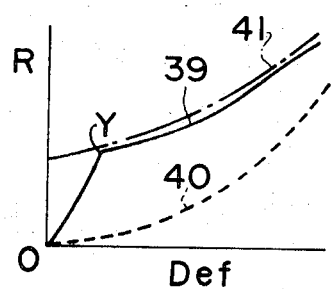
FIG. 7 is a graph showing the relationship of the reaction versus the deflection.

FIGS. 2 and 3 show a fender body 21 made of a flexible material which is filled with compressed air. The walls of body 21 are formed of three bonded layers, i.e. an inner rubber layer 22, a reinforcing intermediate cord layer 23, and an outer rubber layer 24. The inner layer 22 serves as a lining designed to maintain air tightness and is made from a synthetic rubber, such as butyl rubber. The reinforcing cord layer 23 is made from synthetic fiber cords, such as rayon cords, nylon cords and polyester cords, or from wire cords and serves to reinforce the body 21 to thereby increase pressure resistance of the fender. The outer layer 24 is made of a rubber such as natural rubber chosen to provide abrasion-resistance and anti-weathering properties, and serves to protect the inner rubber layer 22 and the reinforcing cord layer 23.

The body 21 is of a hat-shape having a flange portion 21' extending outwardly from the edge of the bottom opening of the body 21. The top wall 21" of the body 21 tends to be inflated outwardly to form a dome shape when the air under pressure is introduced into the chamber A, the height of said dome being in the range of one-sixth to one-eighth of the height of the fender proper.

The term "hat-shape" as used herein and in the appended claims is meant to include both a cylindrical crown shape, as in FIG. 2, and a polygonal cross-section, as shown in FIG. 4. The bottom opening of the body 21 is closed with a bottom plate 26 lined with a rubber layer 25. The rubber layer 25 is vulcanized or otherwise bonded to the inner layer 22 of the flange portion 21', thereby defining chamber A within the body 21, which is filled with compressed air.

Located on the outer surface of the flange portion 21' of the body 21 is a flange plate 27 which has been vulcanized or bonded to the outer rubber layer 24. Extending through the flange plate 27, flange portion 21' and bottom plate 26, in a properly spaced relationship, are bolt holes 28. Thus, anchor bolts 29 are inserted through the bolt holes 28 so as to secure the fender of the present invention to a concrete quay-wall.

An air flow passage 30 is provided extending through the bottom plate 26, with one end of said passage being open to the chamber A and the other end communicating with a check valve 32 mounted in a socket 31, to permit the introduction of pressurized air into the chamber A and the release of air therefrom, as required.

Figure 8:
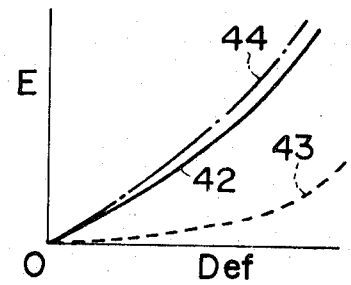
FIG. 8 is a graph showing the relationship between the energy absorption and the deflection of the fender.

The performance characteristics of the fender of the present invention are set forth in FIGS. 5–8. In these plots, the solid lines 33, 36, 39 and 42 represent the performance of the fenders of the invention, while the broken lines 34, 37, 40 and 43 represent the performance characteristics of conventional float type air cushion fenders, and one-point chain lines 35, 38, 41 and 44 designate the performance characteristics for various modifications of the air cushion type fender of the present invention. In FIG. 5 the vertical ordinate represents the inner pressure (P) and the abscissa represents the deflection of the fender body. The curves of FIG. 5 indicate internal pressure rises as the fenders are deflected. In the case of the fenders off the present invention (curves 33 and 35), the changing rate of the deflection is in proportion to that of the volume, suggesting an effective pressure rise as compared with the conventional float type fender (curve 34). In FIG. 6 the vertical ordinate represents the area (S) of a contacting surface, while the abscissa represents the deflection (Def) of the fender. This plot reveals that, in the case of the conventional float type fender (curve 37), the area (S) is gradually increased beginning with the line contact and shifting to the surface contact, because of the fender being of an entirely curved construction, whereas in the case of the modified fender of the invention (curve 38), the area of the contacting surface is constant from the beginning because of the flat top wall of the modified fender. On the other hand, in the case of the basic fender of the present invention (curve 36) having a dome-shaped crown, the area of a contacting surface increases up to the point (X) in FIG. 6 where the dome of the top wall becomes flat thereafter maintaining a constant area of contact. For the conventional air cushion type fender, the reaction (R) represents the product of the inner pressure and the area of a contacting surface, and thus the reactions indicated in FIG. 7 are based on the inner pressures and the areas given in FIGS. 5 and 6. FIG. 7 indicates that the basic domed fender of the present invention (curve 39) gives a gradual increase in reaction from point O until it reaches a point Y, after which the reaction follows a path much above that of the conventional float type fender (curve 40). For the modified fender of the invention (curve 41), the starting reaction is higher than that of the reaction of the basic dome-shaped embodiment. This means that the modified fender of the invention can receive a larger size vessel than does the basic embodiment of the invention. The energy absorption curve as shown in FIG. 8 represents the area encompassed between the reaction curve and the deflection abscissa of FIG. 7. FIG. 8 reveals that the energy absorption of the basic and modified fenders of the invention (curves 42 and 44) is much greater than that of the conventional float type fender (curve 43). This indicates that the fenders of the present invention can receive a much larger size vessel than can the conventional float type fender. Conversely, for a vessel of a given size, the size required for the fenders of the present invention is less than that required for conventional fenders.

Figure 9:
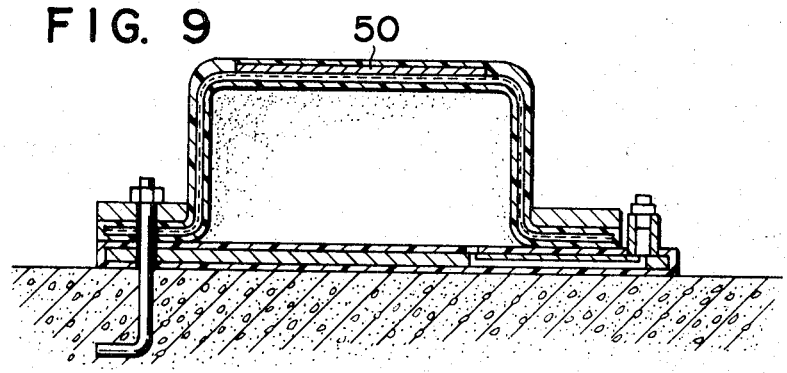
FIG. 9 is a vertical cross-sectional view of one modification of the fender of the present invention, which contains a metal plate in its top wall.
Figure 10:
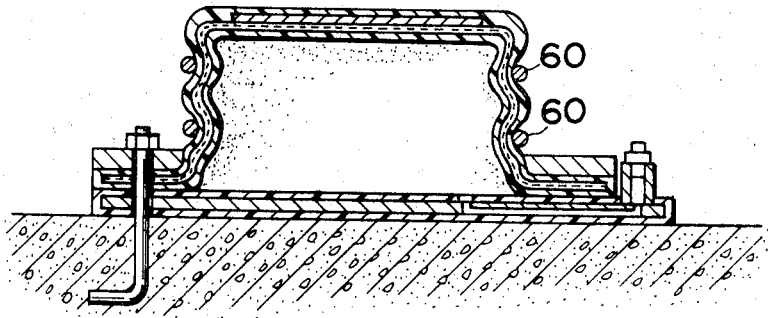
FIG. 10 is a vertical cross-sectional view of a modification of the fender of FIG. 9 which has rings surrounding the side wall of the shell portion of the fender.

Referring now to FIGS. 9 and 10 there are shown in detail various modifications of the basic embodiment of the invention, wherein a metal plate 50 is buried within the top wall of the fender crown for the purpose of increasing the initial reaction so as to be capable of receiving a larger size vessel than is the basic embodiment of the invention, although the initial energy absorption capability is somewhat sacrificed. In a further modified embodiment, shown in FIG. 10, metal rings 60 and 70 are provided which surround the side wall of the shell portion of the fender to permit the receipt of a yet greater size vessel than is possible with the embodiments of FIGS. 3 and 9.

To summarize the features of the fenders of the present invention, in the embodiment of FIG. 3 the initial energy absorption is greatest, thereby presenting the greatest damping capability against the impact at the initial stage of contact between the boat and the quay-wall.

The embodiment of FIG. 9 gives greater reactions to receive a larger size vessel than does the embodiment of FIG. 3.

The embodiment of FIG. 10 gives further reaction or resistance to deflection to receive even larger size vessels than does the embodiment of FIG. 9. However, all three embodiments shown for the invention possess greater reactions and the energy absorption capability than do the conventional float type fenders.

Another important aspect of the invention, common to all three embodiments is that, because of the hat-shape of the fender, if a boat approaches at an angle to the quay-wall or moves after mooring at the quay-wall, the fenders of the present invention can deflect or slip in the direction of the boat movement and then restore to the original hat-shape because of reduced surface contact and friction as compared to conventional fenders.

While the present invention has been described herein with reference to the above embodiments, it should be understood that various changes, modifications, and alterations may be effected without departing from the spirit and the scope of the present invention, as defined by the appended claims.

I claim:

1. An air cushion fender for attachment to a quay-wall, comprising: a hat-shaped body having a cylindrical or polygonal central portion, a crown portion integral with a top part of said central portion, said central portion having a bottom opening, and a flange portion extending outwardly from the edge of said bottom opening, and a bottom plate secured to said hat-shaped body to close and seal said opening thus defining a chamber for pressurized air, said hat-shaped portion being fabricated of a material comprising an outer ply of a flexible material, an intermediate ply of a fiber cord and an inner ply of a flexible material.

2. The fender of claim 1, further comprising a metal plate in the top wall of said crown portion.

3. The fender of claim 2 further comprising at least one metal ring surrounding said crown portion.

4. The fender of claim 1 wherein said flange portion has a plurality of bolt holes and wherein attachment to the quay-wall is provided by means of bolts anchored in said quay-wall and extending through said bolt holes.

5. A fender as defined in claim 1 further comprising valve means and an air flow passage communicating with said valve means for the introduction of pressurized air into said chamber.

6. A fender as defined in claim 5 wherein said air flow passage is located in said bottom plate.

7. A fender as defined in claim 1 wherein said bottom plate comprises a rubber layer and a plate member and wherein said rubber layer is vulcanized to said inner ply of said hat-shaped body.

8. A fender as defined in claim 1 further comprising an annular flange mounted on top of said flange portion of said hat-shaped body.

* * * * *